US012592425B2

(12) United States Patent
Sueyoshi et al.

(10) Patent No.: US 12,592,425 B2
(45) Date of Patent: Mar. 31, 2026

(54) POWER SUPPLY DEVICE AND MECHANICAL DEVICE

(71) Applicant: HONDA MOTOR CO., LTD., Tokyo (JP)

(72) Inventors: Shunichiro Sueyoshi, Wako (JP); Akihiro Kimura, Wako (JP); Kotaro Kawase, Wako (JP); Yoshiharu Nawata, Wako (JP); Mitsuyoshi Kanai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 648 days.

(21) Appl. No.: 17/988,930

(22) Filed: Nov. 17, 2022

(65) Prior Publication Data

US 2023/0090154 A1 Mar. 23, 2023

Related U.S. Application Data

(63) Continuation of application No. PCT/JP2020/022545, filed on Jun. 8, 2020.

(51) Int. Cl.
| | |
|---|---|
| *H01M 10/615* | (2014.01) |
| *F02N 11/08* | (2006.01) |
| *H01M 10/625* | (2014.01) |
| *H01M 10/63* | (2014.01) |

(Continued)

(52) U.S. Cl.
CPC ....... *H01M 10/615* (2015.04); *F02N 11/0866* (2013.01); *F02N 11/087* (2013.01); *H01M 10/625* (2015.04); *H01M 10/63* (2015.04); *A01D 34/6818* (2013.01);

(Continued)

(58) Field of Classification Search
CPC .............. H01M 10/615; H01M 10/63; H01M 2220/20; H01M 2010/4271; H01M 10/425; H01M 50/213; H01M 2220/30; F02N 11/0866; F02N 11/0862; F02N 2200/06
See application file for complete search history.

(56) References Cited

U.S. PATENT DOCUMENTS

| | | | | |
|---|---|---|---|---|
| 5,948,298 A | * | 9/1999 | Ljaz | ........................ B60L 50/51 180/68.5 |
| 7,154,068 B2 | * | 12/2006 | Zhu | ................... H01M 10/6571 219/202 |

(Continued)

FOREIGN PATENT DOCUMENTS

| | | | | |
|---|---|---|---|---|
| CN | 105830275 A | | 8/2016 | |
| CN | 108701882 A | * | 10/2018 | .............. B60L 1/003 |

(Continued)

OTHER PUBLICATIONS

Office Action dated Mar. 28, 2024, issued in counterpart CN Application No. 202080100983.X, with English translation. (12 pages).

(Continued)

*Primary Examiner* — Pedro J Cuevas
(74) *Attorney, Agent, or Firm* — WHDA, LLP

(57) ABSTRACT

A present invention is a power supply device, comprising a battery unit, a heater configured to generate heat on the basis of power of the battery unit, and a driving unit configured to drive the heater with a driving force according to a temperature of the battery unit.

13 Claims, 6 Drawing Sheets

(51) Int. Cl.
    *A01D 34/68*         (2006.01)
    *A01D 101/00*      (2006.01)

(52) U.S. Cl.
    CPC .... *A01D 2101/00* (2013.01); *F02N 2200/023* (2013.01); *H01M 2220/20* (2013.01)

(56) References Cited

U.S. PATENT DOCUMENTS

| | | | | |
|---|---|---|---|---|
| 7,189,942 | B2 * | 3/2007 | Kotani | H01M 10/6551 |
| | | | | 219/202 |
| 8,796,994 | B2 * | 8/2014 | Abe | H01M 10/48 |
| | | | | 320/128 |
| 9,431,688 | B2 * | 8/2016 | Schwarz | H01M 10/633 |
| 10,112,502 | B2 * | 10/2018 | Buckhout | H05B 1/0236 |
| 2005/0218136 | A1 * | 10/2005 | Kotani | B60L 58/27 |
| | | | | 219/202 |
| 2005/0264257 | A1 | 12/2005 | Inui | |
| 2008/0280192 | A1 * | 11/2008 | Drozdz | B60L 3/0046 |
| | | | | 700/297 |
| 2009/0071178 | A1 * | 3/2009 | Major | B60L 58/27 |
| | | | | 62/239 |
| 2011/0206967 | A1 * | 8/2011 | Itsuki | H01M 10/6556 |
| | | | | 429/120 |
| 2011/0288704 | A1 * | 11/2011 | Schwarz | H01M 10/6571 |
| | | | | 219/202 |
| 2012/0217933 | A1 * | 8/2012 | Abe | H01M 10/615 |
| | | | | 320/128 |
| 2016/0315363 | A1 | 10/2016 | Esteghlal | |
| 2017/0110766 | A1 * | 4/2017 | Koebler | H01M 50/597 |
| 2017/0253142 | A1 * | 9/2017 | Buckhout | H01M 10/486 |
| 2018/0261896 | A1 | 9/2018 | Ogawa et al. | |
| 2019/0067761 | A1 | 2/2019 | Catolico et al. | |
| 2024/0010094 | A1 * | 1/2024 | Choi | B60L 58/12 |
| 2024/0080943 | A1 * | 3/2024 | Kikuchi | H05B 1/0236 |

FOREIGN PATENT DOCUMENTS

| | | | | | |
|---|---|---|---|---|---|
| DE | 102014011828 | A1 | | 2/2016 | |
| EP | 3454410 | A1 | * | 3/2019 | B60L 58/21 |
| JP | H09-161853 | A | | 6/1997 | |
| JP | 2005-339980 | A | | 12/2005 | |
| JP | 2005-340211 | A | | 12/2005 | |
| JP | 2007-242316 | A | | 9/2007 | |
| JP | 2009-261175 | A | | 11/2009 | |
| JP | 2013-128354 | A | | 6/2013 | |
| JP | 2015-201303 | A | | 11/2015 | |
| JP | 2018-152221 | A | | 9/2018 | |
| JP | 6483924 | B2 | | 3/2019 | |
| JP | 2019-192381 | A | | 10/2019 | |
| WO | WO-2017191679 | A1 | * | 11/2017 | B60L 58/21 |

OTHER PUBLICATIONS

International Search Report dated Jul. 7, 2020, issued in counterpart Application No. PCT/JP2020/022545, with English translation. (7 pages).

* cited by examiner

F I G. 1
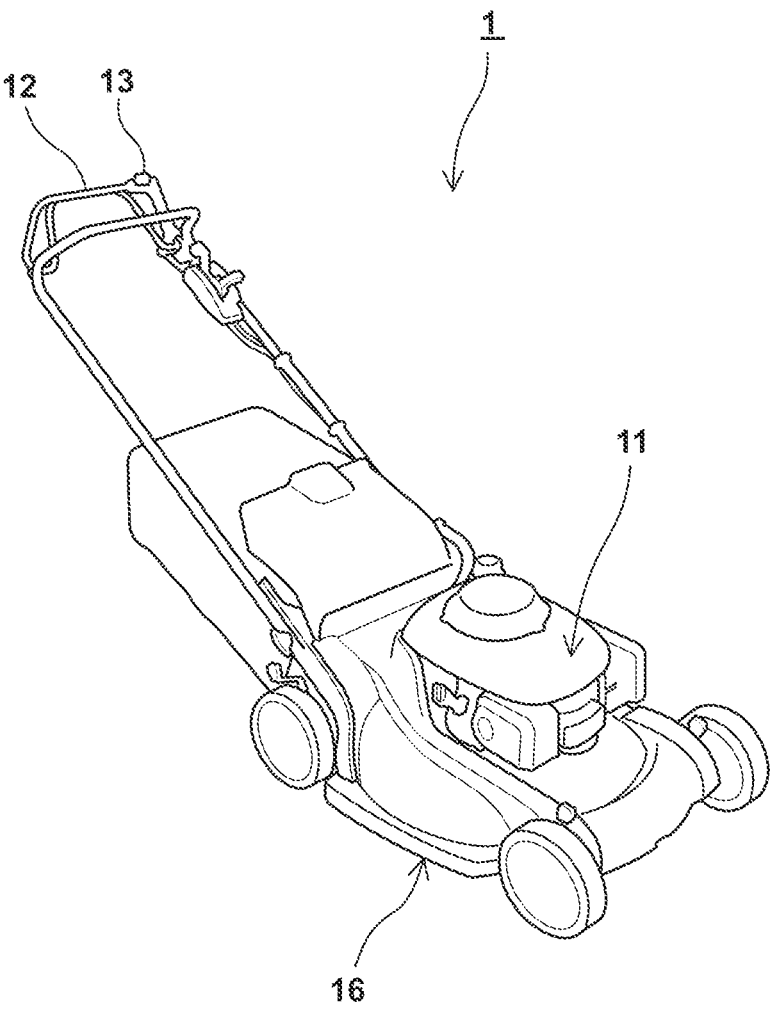

F I G. 2
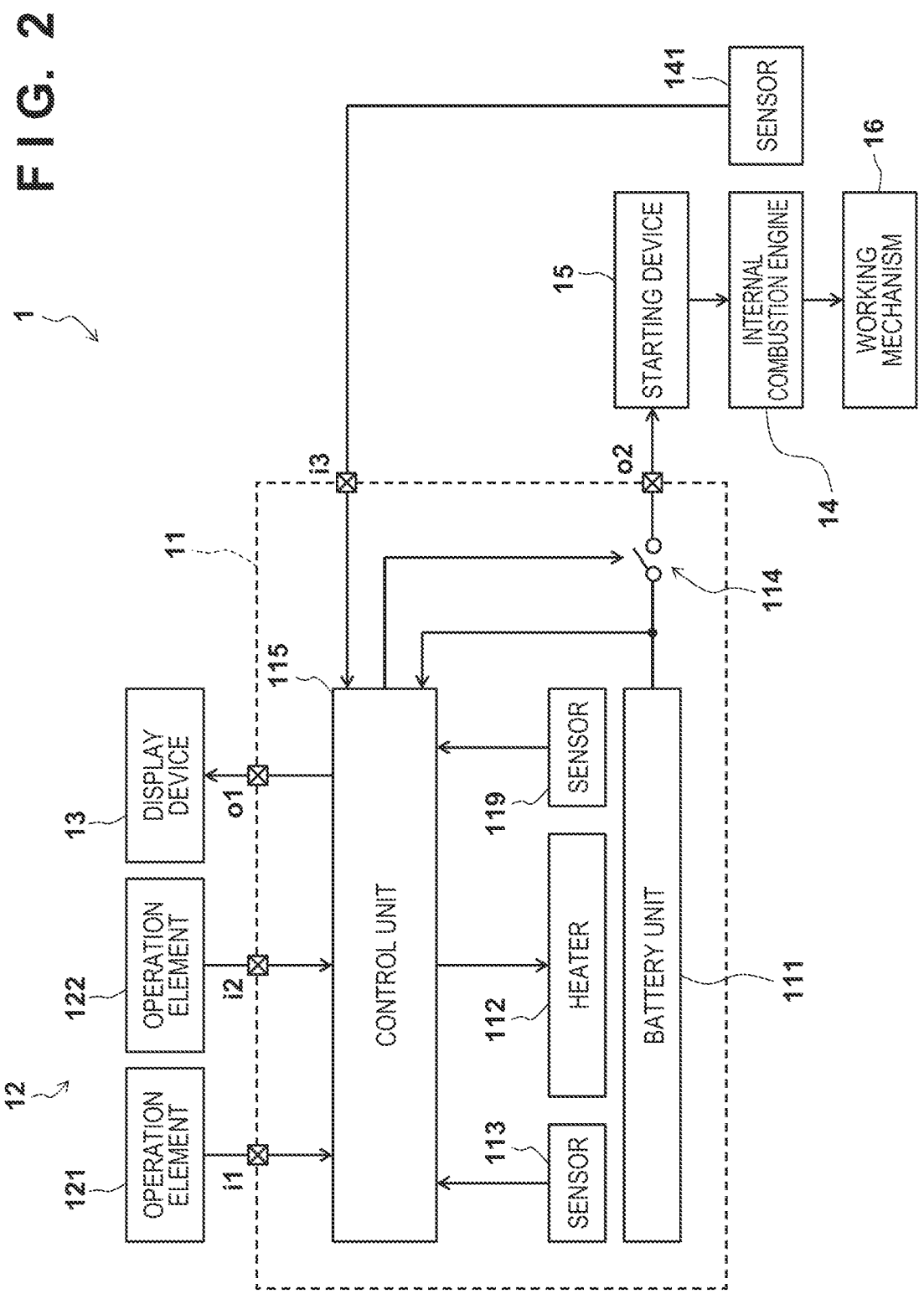

F I G. 3
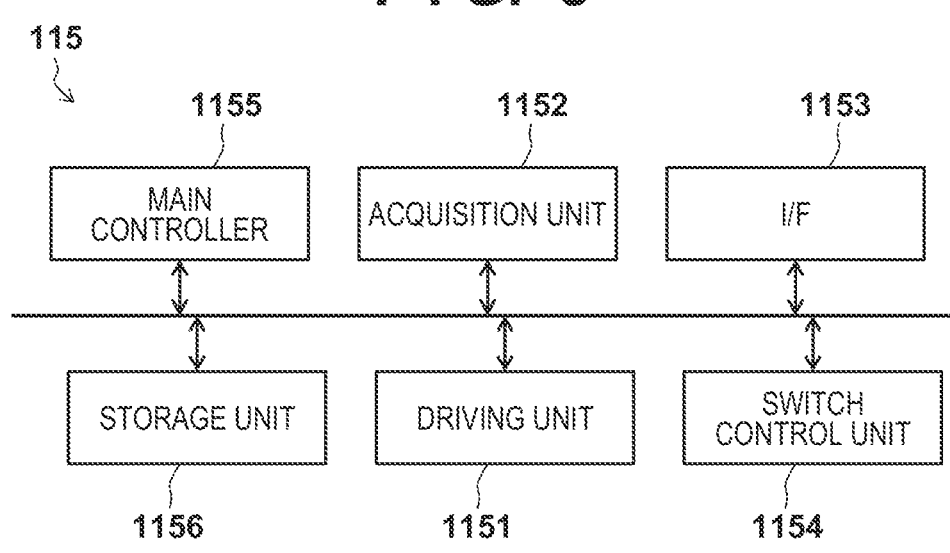
F I G. 4
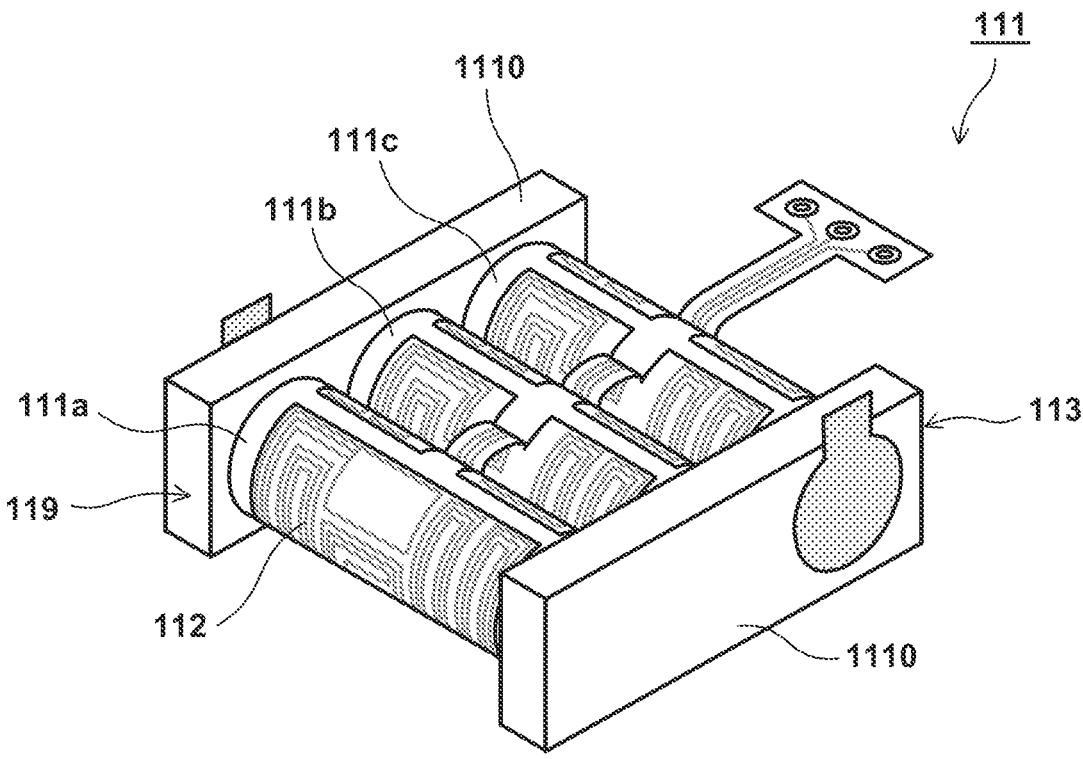

F I G. 5
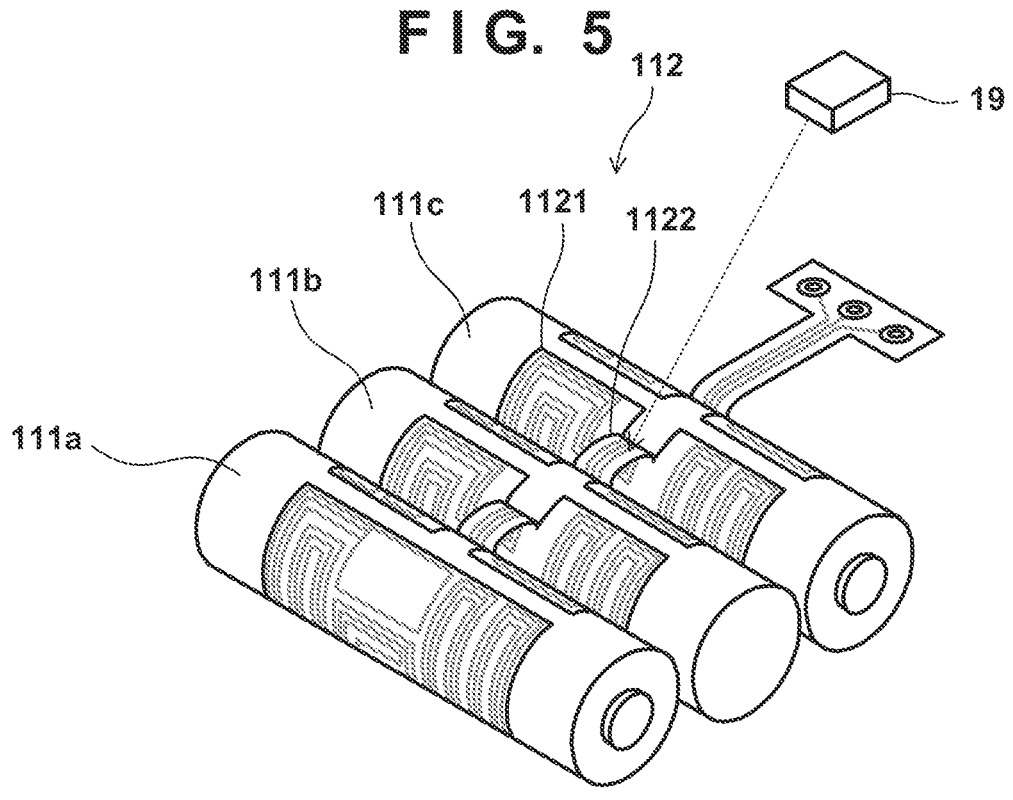
F I G. 6
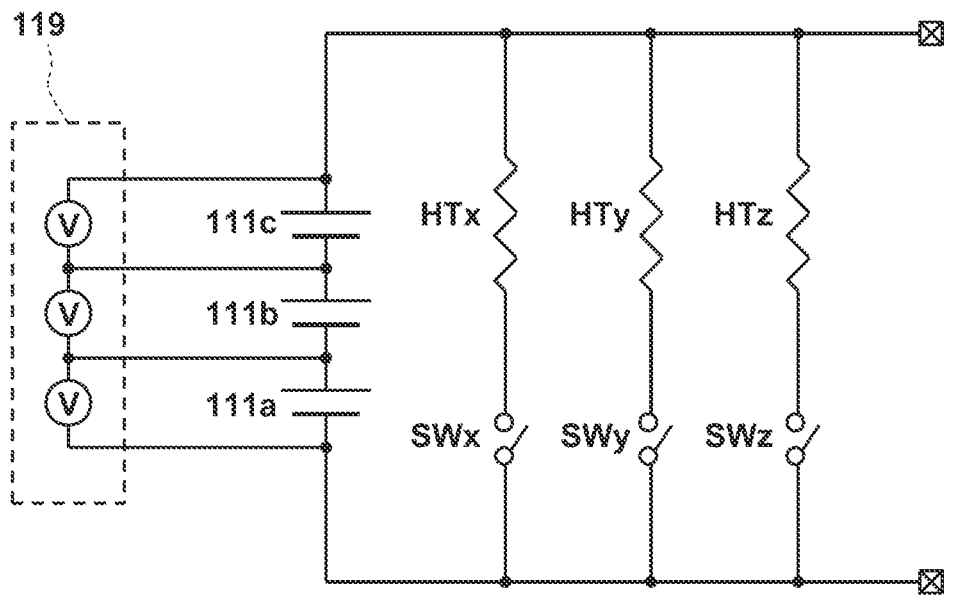

FIG. 8

POWER SUPPLY DEVICE AND MECHANICAL DEVICE

CROSS-REFERENCE TO RELATED APPLICATION(S)

This application is a continuation of International Patent Application No. PCT/JP2020/022545 filed on Jun. 8, 2020, the entire disclosures of which is incorporated herein by reference.

TECHNICAL FIELD

The present invention mainly relates to a power supply device.

BACKGROUND ART

Patent Literature 1 discloses a configuration of a vehicle including a first battery unit, a heater that heats the first battery unit, and a second battery unit that generates power for driving the heater. According to such a configuration, even in a low temperature environment, the first battery unit can be heated by the heater so that output power of the first battery unit satisfies a reference. As a result, the first battery unit can appropriately supply power necessary for starting an internal combustion engine to a starting device, and an overload applied to the first battery unit at that time can be suppressed.

CITATION LIST

Patent Literature

PTL1: Japanese Patent No. 6483924

SUMMARY OF INVENTION

Technical Problem

As described above, Patent Literature 1 discloses that the first battery unit is heated by the heater when the first battery unit has a low temperature. However, since it is conceivable that the second battery unit that generates power for driving the heater also has a low temperature, there is room for improvement in terms of control at the time of driving the heater.

An illustrative object of the present invention is to drive a heater without applying an overload a battery unit.

Solution to Problem

A first aspect of the present invention relates to a power supply device, including: a battery unit; a heater configured to generate heat on the basis of power of the battery unit; and a driving unit configured to drive the heater with a driving force according to a temperature of the battery unit.

Advantageous Effects of Invention

According to the present invention, a heater can be driven without applying an overload to a battery unit.

BRIEF DESCRIPTION OF DRAWINGS

FIG. 1 is a perspective view illustrating a configuration of a working machine according to an embodiment.

FIG. 2 is a block diagram illustrating a configuration example of the working machine.

FIG. 3 is a block diagram illustrating a configuration example of a control unit.

FIG. 4 is a perspective view illustrating an example of a structure of a battery unit.

FIG. 5 is a perspective view illustrating an example of a structure of a battery cell and a heater.

FIG. 6 is a diagram illustrating an example of a circuit configuration of the battery unit.

FIG. 8 is a diagram illustrating another example of the circuit configuration of the battery unit.

DESCRIPTION OF EMBODIMENTS

Figure 7:
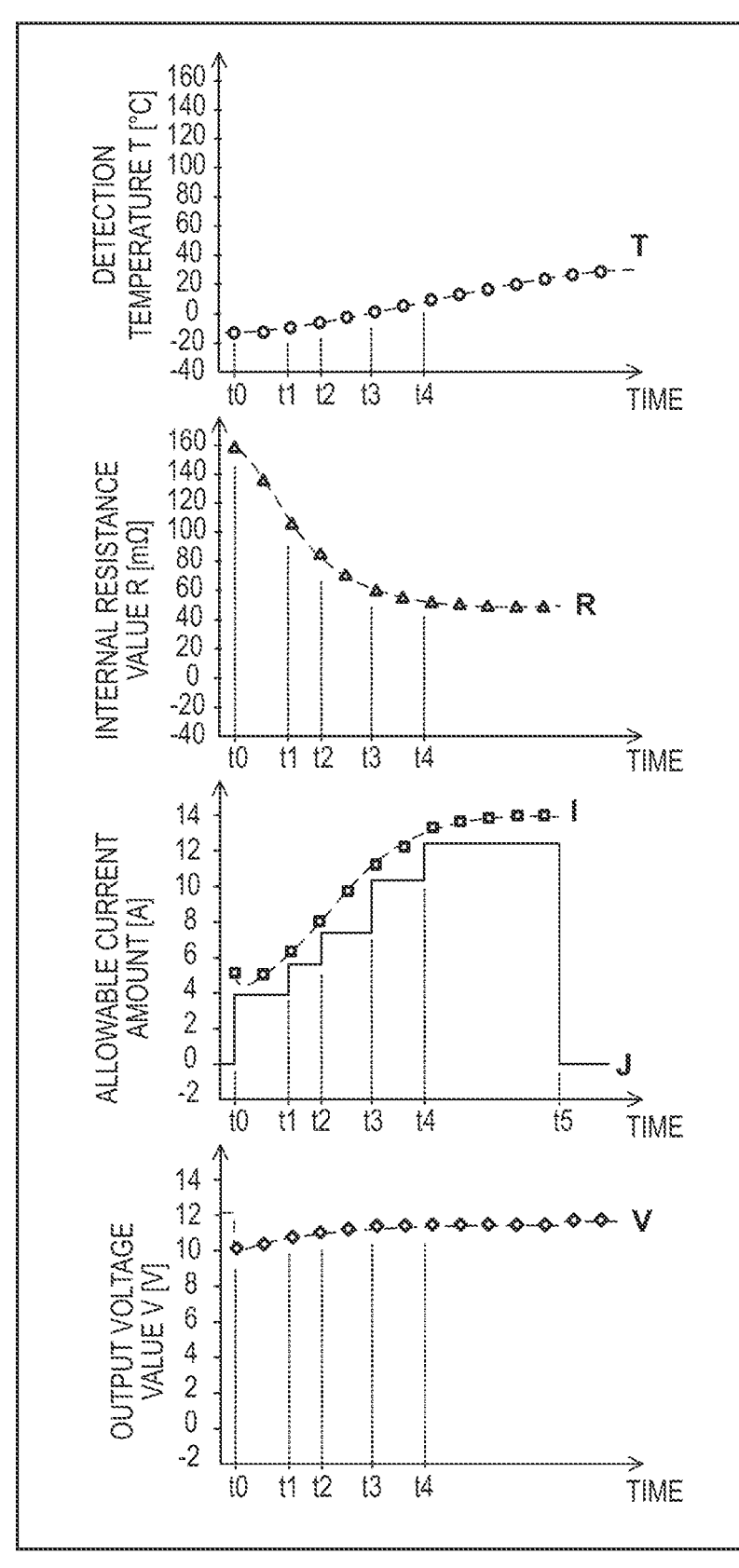
FIG. 7 is a timing chart illustrating a driving mode of the heater.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 illustrates a perspective view of a working machine 1 according to an embodiment. FIG. 2 illustrates a configuration example of the working machine 1. The working machine 1 includes a power supply device 11, an operation device 12, a display device 13, an internal combustion engine 14, a starting device 15, and a working mechanism 16.

The power supply device 11 includes a battery unit 111, a heater 112, a temperature sensor 113, a switch unit 114, and a control unit 115. The battery unit 111 generates power. The heater 112 generates heat on the basis of the power of the battery unit 111. The heater 112 is provided in the battery unit 111 and can heat the battery unit 111 by the generated heat. The temperature sensor 113 is provided on the battery unit 111 and can detect the temperature of the battery unit 111. The switch unit 114 sets whether or not it is possible to output the power of the battery unit 111. The control unit 115 functions as a system controller for controlling an entire portion inside the power supply device 11. Other details will be described later.

The operation device 12 includes an operation element 121 and an operation element 122, and outputs a corresponding signal to the control unit 115 in a case where there is an operation input thereto from a user. Although details will be described later, in the present embodiment, the user can cause the working mechanism 16 to enter a working state by operating the operation element 122 while operating the operation element 121. Any known method such as a lever type or a button type may be adopted in the operation elements 121 and 122.

The display device 13 displays the content based on a signal from the control unit 115. As the display device 13, for example, an indicator including an LED or the like may be used, but alternatively/incidentally, a liquid crystal display may be used, or a touch panel display also serving as a part/all of the functions of the operation device 12 may be used.

The internal combustion engine 14 generates predetermined motive power (rotation). Although details will be described later, the internal combustion engine 14 is incidentally provided with a temperature sensor 141. The starting device 15 is an electric motor also referred to as a starter motor or the like, and starts the internal combustion engine 14 on the basis of power from the power supply device 11 and causes the internal combustion engine 14 to enter an operating state. The working mechanism 16 performs a predetermined work on the basis of the motive power from the internal combustion engine 14 in the operating state. In the present embodiment, it is assumed that the working mechanism 16 is a disk blade that is provided at the bottom of a main body of the working machine 1 and performs mowing as the work content. Known elements may be used as these elements 14 to 16.

FIG. 3 illustrates a configuration example of the control unit 115. The control unit 115 includes a driving unit 1151, an acquisition unit 1152, an interface unit 1153, a switch control unit 1154, a main controller 1155, and a storage unit 1156. The driving unit 1151 is a heater driver that drives the heater 112, and can set (adjust) the driving force of the heater 112 to be changeable. The acquisition unit 1152 acquires detection results of the temperature sensors 113 and 141, and further acquires a detection result of a voltage sensor 119 (see FIGS. 4 and 6) to be described later.

The interface unit 1153 includes input units i1, i2, and i3 and output units o1 and o2 (see FIG. 2). For example, operation inputs to the operation elements 121 and 122 by the user are input to the control unit 115 via the input units i1 and i2, respectively. The detection result of the temperature sensor 141 is input to the control unit 115 via the input unit i3. A signal for making a predetermined notification to the user is output to the display device 13 via the output unit o1. In addition, the power of the battery unit 111 is output to the starting device 15 via the output unit o2.

The switch unit 114 sets whether or not it is possible to output the power from the output unit o2. For example, the switch unit 114 realizes the output of the power by entering a conductive state, and suppresses the output of the power by entering a non-conductive state. Although details will be described later, the switch control unit 1154 controls the switch unit 114 on the basis of the establishment of a predetermined condition.

The main controller 1155 performs calculation processing for executing the main control content of the control unit 115, for example, calculation processing based on a detection result of the temperature sensor 113 or the like acquired by the acquisition unit 1152. For example, the main controller 1155 drives the heater 112 by the driving unit 1151 and controls the switch unit 114 by the switch control unit 1154, on the basis of a result of the calculation. The storage unit 1156 stores information necessary for the calculation processing of the main controller 1155.

FIG. 4 illustrates an example of a structure of the battery unit 111. The battery unit 111 includes a plurality of (three in the present embodiment) battery cells 111a, 111b, and 111c and a battery holder 1110 that holds them. For the battery cells 111a, 111b, and 111c, a rechargeable secondary battery such as a lithium ion battery is used.

The battery holder 1110 holds the battery cells 111a, 111b, and 111c so that they are connected in series. In the battery holder 1110, an electrode made of nickel or the like is provided, and a voltage sensor 119 capable of detecting individual output voltages of the battery cells 111a, 111b, and 111c is provided.

In the present embodiment, in addition to the voltage sensor 119, the above-described temperature sensor 113 is also provided in the battery holder 1110. The temperature sensor 113 may be provided at a position different from the heater 112, and may be provided on the electrode, for example. As a result, the temperature sensor 113 can appropriately detect the temperature of the battery unit 111 without being affected by the heater 112.

FIG. 5 illustrates an example of a structure of each of the battery cells 111a, 111b, and 111c and the heater 112 (the battery holder 1110 in FIG. 4 is not illustrated.). As illustrated in FIG. 5, the heater 112 is formed in a sheet shape by a plurality of (three in the present embodiment) heating wires that generate heat by energization and a sheet member that encloses the plurality of heating wires, and is disposed so as to cover the battery cells 111a, 111b, and 111c across them. The driving unit 1151 can change a driving force of the heater 112, that is, a heating level of the heater 112 by selectively driving one or more of the plurality of heating wires.

Here, it is assumed that, in the heater 112, a portion covering the individual battery cells 111a, 111b, and 111c is defined as a covering portion 1121, and a portion extending between neighboring ones of the plurality of battery cells 111a, 111b, and 111c is defined as a spanning portion 1122. In these portions 1121 and 1122, a protection unit 19 for protecting the heater 112 can be disposed in the spanning portion 1122. As a result, the protection unit 19 can appropriately protect the heater 112 without being affected by the temperature of the individual battery cell 111a and the like. In the protection unit 19, an element that prevents application of an overcurrent to the heater 112, for example, a fuse element such as a current fuse or a temperature fuse, a circuit unit including a fuse element, a package, or an electronic component may be used. From this point of view, the protection unit 19 may be disposed in the spanning portion 1122 that is not easily affected by the temperature of the individual battery cell 111a or the like, so that appropriate control of the heater 112 is enabled.

FIG. 6 illustrates an example of a circuit configuration of the battery cells 111a, 111b, and 111c and the heater 112. Note that the protection unit 19 is not illustrated for ease of description.

In the present embodiment, the heater 112 includes three heating wires (for distinction, the heating wires are defined as heating wires HTx, HTy, and HTz, respectively). Electric resistance values of the heating wires HTx, HTy, and HTz are, for example, 2.0 $[\Omega(\text{ohm})]$, 1.6 $[\Omega]$, and 1.2 $[\Omega]$, respectively. Switch elements SWx, SWy, and SWz are electrically connected in series to the heating wires HTx, HTy, and HTz, respectively. Typically, a metal oxide semiconductor (MOS) transistor, a bipolar transistor, or the like can be used for each of the switch elements SWx, SWy, and SWz. An electric path formed by the heating wire HTx and the switch element SWx, an electric path formed by the heating wire HTy and the switch element SWy, and an electric path formed by the heating wire HTz and the switch element SWz are arranged in parallel with each other.

The driving unit 1151 can selectively drive the heating wires HTx, HTy, and/or HTz by individually controlling the switch elements SWx, SWy, and SWz, thereby changing a heating level of the battery unit 111 by the heater 112. For example, the driving unit 1151 maximizes the heating level by driving all of the heating wires HTx, HTy, and HTz, and reduces the heating level by driving a part of the heating wires.

As described above, the user can cause the working mechanism 16 to enter a working state by operating the operation element 122 while operating the operation element 121. In the present embodiment, the control unit 115 enters a starting state by an operation input to the operation element 121, and the internal combustion engine 14 is started by an operation input to the operation element 122. Heating of the battery unit 111 by the heater 112 may be started in response to an operation input to the operation element 121 in which the control unit 115 enters a starting state, and when the heating is completed, the fact may be displayed on the display device 13. The user can cause the working mechanism 16 to enter a working state by performing an operation input to the operation element 122 according to the display.

As described above, the secondary battery is used for the individual battery cell 111a or the like. When the temperature of the battery unit 111 becomes low, the viscosity of an electrolytic solution built in the individual battery cell 111a or the like becomes high, and this may have an electrical influence on the individual battery cell 111a or the like, such as a decrease in output voltage due to an increase in internal resistance. On the other hand, when the driving force of the heater 112 increases (when the heating level increases), an amount of current to be supplied to the heater 112 increases, so that the load of the battery unit 111 increases. Therefore, it is generally difficult to simultaneously realize driving of the heater 112 using the power of the battery unit 111 at a low temperature and increasing the driving force, and an amount of current or power allowed to be output is set in the battery unit 111 in accordance with the temperature.

FIG. 7 is a timing chart illustrating a driving mode of the heater 112. A horizontal axis represents a time axis, and a vertical axis represents respective values of a detection temperature T, an internal resistance value R, an allowable current amount I, and an output voltage value V.

The detection temperature T indicates a temperature detected by the temperature sensor 113. The internal resistance value R indicates a value of the internal resistance of the battery cell 111a corresponding to the detection temperature T. The allowable current amount I indicates an amount of current that can be output by the battery cell 111a corresponding to the detection temperature T. The detection temperature T, the internal resistance value R, and the allowable current amount I have a relation corresponding to each other, and the other two can be specified or calculated on the basis of one of the detection temperature T, the internal resistance value R, and the allowable current amount I. For example, the internal resistance value R and the allowable current amount I can be specified or calculated on the basis of the detection temperature T by referring to a predetermined reference table. The reference table may be prepared in advance, and can be acquired by actual measurement, simulation analysis, or the like. The output voltage value V indicates a value of the output voltage of the battery cell 111a detected by the voltage sensor 119.

Here, the internal resistance value R, the allowable current amount I, and the output voltage value V of the battery cell 111a are illustrated, but the same applies to the battery cells 111b and 111c.

In the drawing, a total current amount (total amount of current to be supplied to the heating wires HTx, HTy, and HTz) J to be supplied to the heater 112 is also illustrated. At time t0 when driving of the heater 112 is started, the driving unit 1151 keeps the heating level of the heater 112 small, for example, such that the total current amount J becomes equal to or less than the allowable current amount I. Thereafter, the driving unit 1151 increases the heating level by the heater 112 as the detection temperature T increases (that is, the allowable current amount I increases). For example, the heating level can be minimized at time t0, and the heating level can be sequentially increased at subsequent times t1, t2, . . . , and t4. Here, it is assumed that the heating by the heater 112 is performed until time t5.

In the present embodiment, the aspect in which the heating level is increased stepwise has been exemplified, but as another embodiment, the heating level may be increased linearly. This can be realized by so-called pulse width modulation (PWM) control, and the heating level can be arbitrarily set by changing a duty ratio of a driving signal of the heater 112 (a ratio of a high-level period to a predetermined cycle).

Note that a period from time t0 to time t5 (alternatively, a period until the heating level is maximized and the detection temperature T enters a steady state) may vary depending on a size of the battery unit 111 or the like, but is, for example, less than 1 [minute] or about 1 to 4 [minute].

According to such a configuration, the battery unit 111 can be used with power according to its temperature, and the heater 112 can be driven without applying an overload to the battery unit 111.

In the present embodiment, the heater 112 is provided in the battery unit 111, and the battery unit 111 is heated by the driving of the heater 112. As a result, under a low temperature environment (for example, −40 degrees, −25 degrees, or the like) such as a cold district, the power supply device 11 increases the battery unit 111 to a desired temperature, and then supplies power required for starting the internal combustion engine 14 to the starting device 15.

After the internal combustion engine 14 is started and enters an operating state, the battery unit 111 can be charged on the basis of the motive power of the internal combustion engine 14 in the operating state. Therefore, even after the internal combustion engine 14 enters the operating state, the driving of the heater 112 can be continued so that the charging is not performed under a low temperature environment/the charging is performed at a temperature within a desired range. As another embodiment, when the internal combustion engine 14 and the battery unit 111 are installed close to each other and the battery unit 111 can receive heat from the internal combustion engine 14 in the operating state, the driving of the heater 112 may be suppressed before the supply of power to the starting device 15 (before starting the internal combustion engine 14).

Here, the power to be supplied to the starting device 15 to start the internal combustion engine 14 varies depending on the temperature of the internal combustion engine 14. For example, the lower the temperature of the internal combustion engine 14, the greater the power to be supplied to the starting device 15. Therefore, the battery unit 111 needs to be heated by the heater 112 to a temperature at which sufficient power can be supplied to the starting device 15 (until the allowable current amount I becomes sufficiently large). In order to realize this, in the present embodiment, the temperature sensor 141 is provided in the internal combustion engine 14. The control unit 115 may drive the heater 112 by the driving unit 1151 on the basis of the detection result of the temperature sensor 141 and control the switch unit 114 by the switch control unit 1154.

For example, when the internal combustion engine 14 has a relatively low temperature, the control unit 115 heats the battery unit 111 by driving the heater 112 by the driving unit 1151 until time t5, and then causes the switch unit 114 to enter a conductive state by the switch control unit 1154.

On the other hand, when the internal combustion engine 14 has a relatively high temperature, the control unit 115 heats the battery unit 111 by driving the heater 112 by the driving unit 1151, for example, until any one of times t1 to t4, and then causes the switch unit 114 to enter a conductive state by the switch control unit 1154. Further, in a case where the internal combustion engine 14 has a sufficiently high temperature, the control unit 115 can cause the switch unit 114 to enter a conductive state by the switch control unit 1154 at time t0 (without driving the heater 112).

The switch unit 114 is caused to enter a conductive state after the battery unit 111 is heated to which temperature (alternatively, the switch unit 114 is caused to enter a conduction state at which timing after time t0) can be stored in the storage unit 1156 as a database. For example, the storage unit 1156 stores information indicating a relation between power required for the starting device 15 to start the internal combustion engine 14 at a certain temperature and a temperature of the battery unit 111 that can output the power. Therefore, the switch control unit 1154 can control the switch unit 114 on the basis of the information read from the storage unit 1156 and the detection result of the temperature sensor 141.

After the internal combustion engine 14 is started and enters an operating state, the working mechanism 16 enters a working state based on the motive power of the internal combustion engine 14 in the operating state. As a result, the user can perform a predetermined work using the working machine 1. At that time, the battery unit 111 can be charged on the basis of the motive power of the internal combustion engine 14 in the operating state.

After the work, the user can operate the operation elements 121 and/or 122 to stop the internal combustion engine 14. After the internal combustion engine 14 is stopped, the temperatures of the internal combustion engine 14 and the battery unit 111 can be reduced again with the lapse of time. Typically, in the main body of the working machine 1, the internal combustion engine 14 and the battery unit 111 are installed apart from each other, and in many cases, the temperature of the battery unit 111 can be reduced quickly than the internal combustion engine 14. On the other hand, since it is conceivable that the user restarts the internal combustion engine 14 within a relatively short time, the driving unit 1151 may continue to drive the heater 112 over a predetermined period after the stopping the internal combustion engine 14. As a result, when the internal combustion engine 14 is caused to enter an operating state again, the user can quickly realize this.

Incidentally, the acquisition unit 1152 may acquire the load state of the battery unit 111, and the driving unit 1151 may set the driving force of the heater 112 on the basis of the load state. The load state can be evaluated by detecting the output voltages of the battery cells 111a, 111b, and 111c by the voltage sensor 119. For example, even if the battery cells 111a, 111b, and 111c have the same temperature, there is a possibility that the battery cells output different voltages due to a degree of deterioration. Therefore, the load state may be evaluated on the basis of the minimum one of the output voltages of the battery cells 111a, 111b, and 111c. According to such an aspect, it is possible to appropriately prevent an overload from being applied to each of the battery cells 111a, 111b, and 111c.

In the present embodiment, the aspect in which the work can be executed by operating the operation element 122 while operating the operation element 121 (so-called two-step operation) is exemplified, but other operation methods may be adopted. As another embodiment, one of the operation elements 121 and 122 may be provided, and the work may be executed by operating the same (so-called one-step operation).

For example, in a case where the operation element 121 of the operation elements 121 and 122 is provided, in the power supply device 11, the control unit 115 is started and the driving unit 1151 drives the heater 112 in response to an operation input to the operation element 121 by the user. Thereafter, the completion of heating of the battery unit 111 may be notified to the user by the display device 13 at timing when the battery unit 111 is ready to output power required for the starting device 15 to start the internal combustion engine 14. The switch control unit 1154 may control the switch unit 114 so that the switch unit 114 enters a conductive state, on the basis of that the operation input to the operation element 121 is performed again by the user in response to the notification.

Figure 8:
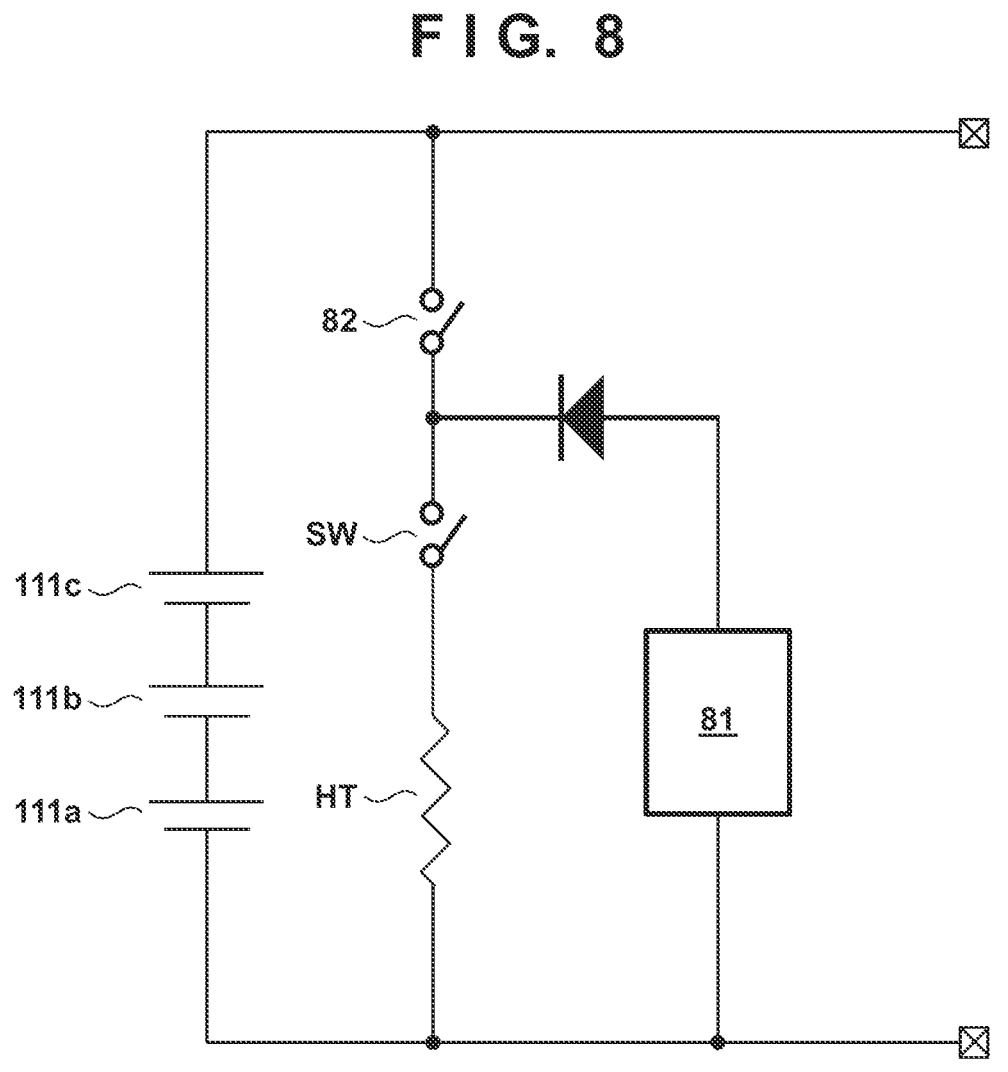

FIG. 8 illustrates an example of a circuit configuration including the battery unit 111 and the heater 112 as a modification, similarly to FIG. 6. In the present modification, for ease of description, the heating wires HTx, HTy, and HTz are illustrated as a heating wire HT, and the switch elements SWx, SWy, and SWz are illustrated as a switch element SW. Here, the heating wire HT (heater 112) is disposed on the ground side with respect to the switch element SW, but the positions of the heating wire HT and the switch element SW can be replaced with each other.

In the present modification, a power generation unit 81 and a switch element 82 are further provided. The power generation unit 81 is configured to be able to generate power on the basis of the motive power of the internal combustion engine 14 in the operating state. Typically, a known charge coil unit including an inductor, a capacitor, and the like is used in the power generation unit 81, and the power generation unit 81 generates power on the basis of rotation of a flywheel provided in the internal combustion engine 14.

The switch element 82 is disposed so as to be inserted into an electric path from the battery cells 111a to 111c (battery unit 111) to the heating wire HT and the switch element SW. The driving unit 1151 can individually control the switch elements SW and 82.

In such a configuration, before starting the internal combustion engine 14, by causing both the switch elements SW and 82 to enter a conductive state, the heating wire HT can receive power from the battery cells 111a to 111c. On the other hand, after the starting the internal combustion engine 14, by causing the switch element SW to enter a conductive state and causing the switch element 82 to enter a nonconductive state, the heating wire HT can receive power from the power generation unit 81.

In addition, when the battery unit 111 reaches a desired temperature, the driving unit 1151 can switch the supply destination of the power of the power generation unit 81 from the heating wire HT to the battery cells 111a to 111c by controlling the switch elements SW and 82. According to such a configuration, both temperature maintenance of the battery unit 111 and charging of the battery unit 111 can be realized relatively easily.

In the above description, to facilitate understanding, each element is indicated by a name related to its functional aspect, but each element is not limited to an element that has the content described in the embodiment as a main function, and may be an element that has the content supplementarily. Further, in the above embodiment, both the power for driving the heater 112 and the power supplied to the starting device 15 are generated by the common battery unit 111, but the power may be individually generated (by different battery units). Further, in the above embodiment, the power supply device 11 is described by exemplifying the working machine 1, but the work content of the working machine 1 can include various works such as a snow removal work and an agricultural work in addition to the mowing work. In addition, the application target of the power supply device 11 is not limited to the working machine 1, and for example, the power supply device 11 can be applied to various mechanical devices that operate using the motive power of the internal combustion engine 14, such as a vehicle.

The features illustrated in the above embodiment are summarized as follows:

A first aspect relates to a power supply device (for example, 11), including: a battery unit (for example, 111); a heater (for example, 112) configured to generate heat on the basis of power of the battery unit; and a driving unit (for example, 1151) configured to drive the heater with a driving force according to a temperature of the battery unit.

According to the first aspect, the battery unit can be used with power according to its temperature, and the heater can be driven without applying an overload to the battery unit. As a result, it is possible to prevent the overload from being applied to the battery unit, for example, in a cold district.

A second aspect is further including: an acquisition unit (for example, 1152) configured to acquire a load state of the battery unit, in which the driving unit sets the driving force on the basis of the temperature and the load state.

According to the second aspect, it is possible to appropriately prevent the overload from being applied to the battery unit.

A third aspect is that the heater is provided in the battery unit.

According to the third aspect, the battery unit can be heated.

A fourth aspect is that the battery unit includes a plurality of battery cells (for example, 111a and the like) electrically connected in series.

According to the fourth aspect, power that can be output can be increased.

A fifth aspect is that the acquisition unit can acquire respective output voltages of the plurality of battery cells, and acquires the load state on the basis of a minimum one of the output voltages.

According to the fifth aspect, it is possible to prevent the overload from being applied to each of the plurality of battery cells.

A sixth aspect is further including: a temperature sensor (for example, 113) configured to detect the temperature and is provided on the battery unit at a position different from a position of the heater.

According to the sixth aspect, the driving force of the heater can be set according to the temperature of the battery unit. In addition, since the temperature sensor is provided at a position different from the position of the heater, the temperature sensor is not affected by the heater at the time of detecting the temperature.

A seventh aspect is further including: a protection unit (for example, 19) configured to protect the heater by preventing application of an overcurrent to the heater, in which the heater covers the plurality of battery cells across the plurality of battery cells, and when a portion of the heater that covers the individual battery cells is defined as a first portion (for example, a covering portion 1121), and a portion extending between neighboring ones of the plurality of battery cells is defined as a second portion (for example, a spanning portion 1122), the protection unit is disposed in the second portion.

According to the seventh aspect, the heater can be appropriately protected without being affected by the temperature of the battery cell.

An eighth aspect is further including: an output unit (for example, o2) capable of outputting power to a starting device (for example, 15) for starting an internal combustion engine (for example, 14); a switch unit (for example, 114) configured to set whether or not it is possible to output the power from the output unit; and a switch control unit (for example, 1154) configured to control the switch unit so that the output of the power from the output unit is realized when the battery unit is ready to output power required for the starting device to start the internal combustion engine.

According to the eighth aspect, the power to be supplied to the starting device can be appropriately output.

A ninth aspect is that the switch control unit controls the switch unit on the basis of a temperature of the internal combustion engine.

According to the ninth aspect, power according to the temperature of the internal combustion engine can be appropriately output.

A tenth aspect is that the switch control unit controls the switch unit so that the output of the power from the output unit is realized in response to an operation input for starting the internal combustion engine.

According to the tenth aspect, the internal combustion engine can be appropriately started.

An eleventh aspect is that the battery unit is configured to be chargeable on the basis of motive power of the internal combustion engine, and the driving unit continues driving of the heater after starting the internal combustion engine.

According to the eleventh aspect, the battery unit can be appropriately charged.

A twelfth aspect is further including: a power generation unit configured to generate power on the basis of motive power of the internal combustion engine after starting the internal combustion engine, in which the heater receives power from the battery unit before starting the internal combustion engine, and receives power from the power generation unit after starting the internal combustion engine.

According to the twelfth aspect, power can be appropriately supplied to the heater. A known charge coil unit that generates power on the basis of rotation of a flywheel provided in the internal combustion engine may be used in the power generation unit.

A thirteenth aspect is that the power generation unit switches the power supply destination from the heater to the battery unit when the battery unit reaches a desired temperature.

According to the thirteenth aspect, the battery unit can be appropriately charged.

A fourteenth aspect is that the driving unit drives the heater over a predetermined period after stopping the internal combustion engine.

According to the fourteenth aspect, the internal combustion engine can be quickly caused to enter an operating state again.

Another aspect relates to a working machine (for example, 1), a vehicle, or a mechanical device, and this is including: the above-described power supply device (for example, 11), the internal combustion engine, and the starting device.

That is, the above-described power supply device can be applied to various mechanical devices that operate using motive power of the internal combustion engine, such as the working machine and the vehicle.

The invention is not limited to the foregoing embodiments, and various variations/changes are possible within the spirit of the invention.

The invention claimed is:

1. A power supply device, comprising:
   a battery unit;

a heater configured to generate heat on the basis of power of the battery unit;

a heater driver configured to drive the heater with a heating level according to a temperature of the battery unit;

a temperature sensor configured to detect the temperature of the battery unit and is provided on the battery unit at a position different from a position of the heater;

an acquisition unit configured to acquire a load state of the battery unit; and a protection unit configured to protect the heater by preventing application of an overcurrent to the heater, wherein the heater driver sets the heating level on the basis of the temperature and the load state, the battery unit includes a plurality of battery cells electrically connected in series, the heater covers the plurality of battery cells across the plurality of battery cells, and wherein a portion of the heater that contacts the individual battery cells is defined as a first portion, and a portion positioning between adjacent two of the plurality of battery cells and being separated from the individual battery cells is defined as a second portion, the protection unit is disposed in the second portion.

2. The power supply device according to claim 1, wherein the heater is provided in the battery unit.

3. The power supply device according to claim 1, wherein the acquisition unit is configured to acquire respective output voltages of the plurality of battery cells, and acquires the load state on the basis of a minimum one of the output voltages.

4. The power supply device according to claim 1, further comprising:

an output unit configured to output power to a starting device for starting an internal combustion engine;

a switch unit configured to set whether or not it is possible to output the power from the output unit; and a switch control unit configured to control the switch unit so that the output of the power from the output unit is realized when the battery unit is ready to output power required for the starting device to start the internal combustion engine.

5. The power supply device according to claim 4, wherein the switch control unit controls the switch unit on the basis of a temperature of the internal combustion engine.

6. The power supply device according to claim 4, wherein the switch control unit controls the switch unit so that the output of the power from the output unit is realized in response to an operation input for starting the internal combustion engine.

7. The power supply device according to claim 4, wherein the battery unit is configured to be chargeable on the basis of motive power of the internal combustion engine, and the heater driver continues driving of the heater after starting the internal combustion engine.

8. The power supply device according to claim 4, further comprising a power generation unit configured to generate power on the basis of motive power of the internal combustion engine after starting the internal combustion engine, wherein the heater receives power from the battery unit before starting the internal combustion engine, and receives power from the power generation unit after starting the internal combustion engine.

9. The power supply device according to claim 8, wherein the power generation unit switches the power supply destination from the heater to the battery unit when the battery unit reaches a desired temperature.

10. The power supply device according to claim 4, wherein the heater driver drives the heater over a predetermined period after stopping the internal combustion engine.

11. A mechanical device, comprising:

the power supply device according to claim 4; the internal combustion engine; and the starting device.

12. A power supply device, comprising:

a battery unit;

a heater configured to generate heat on the basis of power of the battery unit;

a heater driver configured to drive the heater with a heating level according to a temperature of the battery unit;

a temperature sensor configured to detect the temperature and is provided on the battery unit at a position different from a position of the heater;

an output unit configured to output power to a starting device for starting an internal combustion engine;

a switch unit configured to set whether or not it is possible to output the power from the output unit; and a switch control unit configured to:

determine whether the battery unit is ready to output power required for the starting device to start the internal combustion engine, and control the switch unit so that the output of the power from the output unit is realized when it is determined that the battery unit is ready to output power required for the starting device to start the internal combustion engine, wherein the switch control unit determines whether the battery unit is ready to output power required for the starting device to start the internal combustion engine on the basis of a temperature of the internal combustion engine.

13. A power supply device, comprising:

a battery unit;

a heater configured to generate heat on the basis of power of the battery unit;

a heater driver configured to drive the heater with a heating level according to a temperature of the battery unit;

a temperature sensor configured to detect the temperature and is provided on the battery unit at a position different from a position of the heater;

an output unit configured to output power to a starting device for starting an internal combustion engine;

a switch unit configured to set whether or not it is possible to output the power from the output unit; and a switch control unit configured to:

determine whether the battery unit is ready to output power required for the starting device to start the internal combustion engine, and control the switch unit so that the output of the power from the output unit is realized when it is determined that the battery unit is ready to output power required for the starting device to start the internal combustion engine, wherein the switch control unit controls the switch unit so that the output of the power from the output unit is realized in response to an operation input for starting the internal combustion engine.

* * * * *